(12) United States Patent
Furutake

(10) Patent No.: US 10,511,756 B2
(45) Date of Patent: Dec. 17, 2019

(54) VEHICULAR CAMERA AND VEHICULAR CAMERA ASSEMBLY

(71) Applicant: DENSO CORPORATION, Kariya, Aichi-pref. (JP)

(72) Inventor: Yasuki Furutake, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 30 days.

(21) Appl. No.: 15/981,215

(22) Filed: May 16, 2018

(65) Prior Publication Data

US 2018/0338074 A1 Nov. 22, 2018

(30) Foreign Application Priority Data

May 18, 2017 (JP) .................. 2017-098960

(51) Int. Cl.
*H04N 5/225* (2006.01)
*B60R 11/04* (2006.01)
*B60R 11/00* (2006.01)

(52) U.S. Cl.
CPC ........... *H04N 5/2254* (2013.01); *B60R 11/04* (2013.01); *H04N 5/2252* (2013.01); *H04N 5/2257* (2013.01); *B60R 2011/0026* (2013.01); *B60R 2011/0071* (2013.01)

(58) Field of Classification Search
CPC .. H04N 5/2254; H04N 5/2257; H04N 5/2252; B60R 11/04; B60R 2011/0071; B60R 2011/0026

See application file for complete search history.

(56) References Cited

U.S. PATENT DOCUMENTS

| 2015/0042804 A1* | 2/2015 | Okuda ................... B60R 11/04 348/148 |
| 2016/0318457 A1 | 11/2016 | Nakano et al. |
| 2018/0338074 A1* | 11/2018 | Furutake ............. H04N 5/2257 |

FOREIGN PATENT DOCUMENTS

| JP | 2001-094843 A | 4/2001 |
| JP | 2010-042703 A | 2/2010 |
| JP | 2013-246324 A | 12/2013 |
| JP | 5761100 B2 | 8/2015 |
| JP | 2016-208466 A | 12/2016 |

* cited by examiner

*Primary Examiner* — Christopher S Kelley
*Assistant Examiner* — Nasim N Nirjhar
(74) *Attorney, Agent, or Firm* — Knobbe, Martens, Olson & Bear, LLP

(57) ABSTRACT

In a vehicular camera, a light receiving area of a light detector is arranged to receive light incident thereto via a lens and is arranged such that a predetermined portion of the light receiving area is located along the inclination direction of the inner surface of a windshield. A housing supports the lens and stores the light detector such that the lens faces the inner surface of the windshield, and the optical axis of the lens intersects with the inner surface of the windshield at an angle selected from a predetermined angular range including a right angle. The focal length of the lens is set within a range expressed by the following equation:

$$(V/11.43) \leq f \leq (V/2.48)$$

where f represents the focal length, and V represents half of a length in millimeters of the predetermined portion of the light receiving area along the inclination direction of the inner surface of the windshield.

7 Claims, 4 Drawing Sheets

VEHICULAR CAMERA AND VEHICULAR CAMERA ASSEMBLY

CROSS REFERENCE TO RELATED APPLICATION

This application is based on and claims the benefit of priority from Japanese Patent Application No. 2017-098960 filed on May 18, 2017, the disclosure of which is incorporated in its entirety herein by reference.

TECHNICAL FIELD

The present disclosure relates to vehicular cameras arranged in the interior of a vehicle to face a windshield of the vehicle, and vehicular camera assemblies each comprised of a vehicular camera and a windshield of a vehicle, the vehicular camera being mounted to a windshield of the vehicle.

BACKGROUND

Japanese Patent Publication No. 5761100, which will be referred to as a published patent document, discloses a vehicular camera attached to the front windshield of a vehicle. The vehicular camera disclosed in the published patent document is configured to capture, via a lens, images of a predetermined image region defined in front of the vehicle; the images include, for example, target objects to be imaged, such as one or more pedestrians and/or on or more vehicles, located in front of the vehicle.

In particular, the vehicular camera disclosed in the published patent document is provided with a hood for preventing irrelevant views located outside the predetermined image region from being captured by the vehicular camera.

SUMMARY

Increasing the size of the lens to expand the image region of such a vehicular camera enables more target objects located in front of the vehicle to be recognized based on the images captured by the vehicular camera. Unfortunately, increasing the size of the lens of the vehicular camera may cause the size of the hood to increase. This may cause a possibility of limitation of the driver's forward view.

In view of the circumstances set forth above, a first aspect of the present disclosure seeks to provide vehicular cameras, each of which is configured to eliminate the need of increasing the size of a hood for expanding a predetermined image region of the vehicular camera.

Additionally, a second aspect of the present disclosure seeks to provide assemblies each comprised of such a vehicular camera according to the first aspect and a windshield of a vehicle, the vehicular camera is mounted to the windshield.

According to a first exemplary aspect of the present disclosure, there is provided a vehicular camera to be installed in an interior of a vehicle to face an inner surface of a windshield of the vehicle. The inner surface of the windshield is inclined with respect to a longitudinal direction of the vehicle. The vehicular camera is configured to capture an image in front of the vehicle. The vehicular camera includes a lens having an optical axis and a focal length, and a light detector having a light receiving area, the light receiving area being arranged to receive light incident thereto via the lens and being arranged such that a predetermined portion of the light receiving area is located along an inclination direction of the inner surface of the windshield. The vehicular camera includes a housing configured to support the lens and the light detector such that 1. The lens faces the inner surface of the windshield
2. The optical axis of the lens intersects with the inner surface of the windshield at an angle selected from a predetermined angular range, the angular range including a right angle The focal length of the lens is set within a predetermined range expressed by the following equation:

$$(V/11.43) \leq f \leq (V/2.48)$$

where f represents the focal length, and V represents half of a length in millimeters of the predetermined portion of the light receiving area along the inclination direction of the inner surface of the windshield.

According to a second exemplary aspect of the present disclosure, there is provided a vehicular camera assembly. The vehicular camera assembly includes a windshield of a vehicle, and a vehicular camera mounted to the windshield of the vehicle to face an inner surface of the windshield. The inner surface of the windshield is inclined with respect to a longitudinal direction of the vehicle. The vehicular camera is configured to capture an image in front of the vehicle. The vehicular camera includes a lens having an optical axis and a focal length, and a light detector having a light receiving area, the light receiving area being arranged to receive light incident thereto via the lens and being arranged such that a predetermined portion of the light receiving area is located along an inclination direction of the inner surface of the windshield. The vehicular camera includes a housing configured to support the lens and the light detector such that 1. The lens faces the inner surface of the windshield
2. The optical axis of the lens intersects with the inner surface of the windshield at an angle selected from a predetermined angular range, the angular range including a right angle The focal length of the lens is set within a predetermined range expressed by the following equation:

$$(V/11.43) \leq f \leq (V/2.48)$$

where f represents the focal length, and V represents half of a length in millimeters of the predetermined portion of the light receiving area along the inclination direction of the inner surface of the windshield.

The housing according to each of the first and second exemplary aspects is configured to support the lens and the light detector such that the lens faces the inner surface of the windshield, and the optical axis of the lens is perpendicular to the inner surface of the windshield.

As compared with a conventional vehicular camera having a lens whose optical axis is directed to the forward direction of a corresponding vehicle, the vehicular camera according to each of the first and second exemplary aspects enables a minimum distance defined between a farthermost point of the lens from the housing, i.e. a peripheral edge of the lens, and the inner surface of the windshield to be lower. This therefore enables the size of a hood, which aims to prevent scenes located outside an image region of the vehicular camera from being captured by the light receiving area of the light detector, to be smaller than the size of a hood of the conventional vehicular camera.

In particular, the vehicular camera according to each of the first and second exemplary aspects is configured such that the focal length f of the lens is set to be within the range expressed by the equation $(V/11.43) \leq f \leq (V/2.48)$ This configuration prevents an increase of the size of the hood due to the lens having a sufficient view angle required to capture taller target objects, such as pedestrians, located in front of the vehicle.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

The following describes an exemplary embodiment of the present disclosure with reference to the accompanying drawings.

The following describes a vehicular camera 1 according to the exemplary embodiment with reference to FIGS. 1 to 6.

Figure 1:
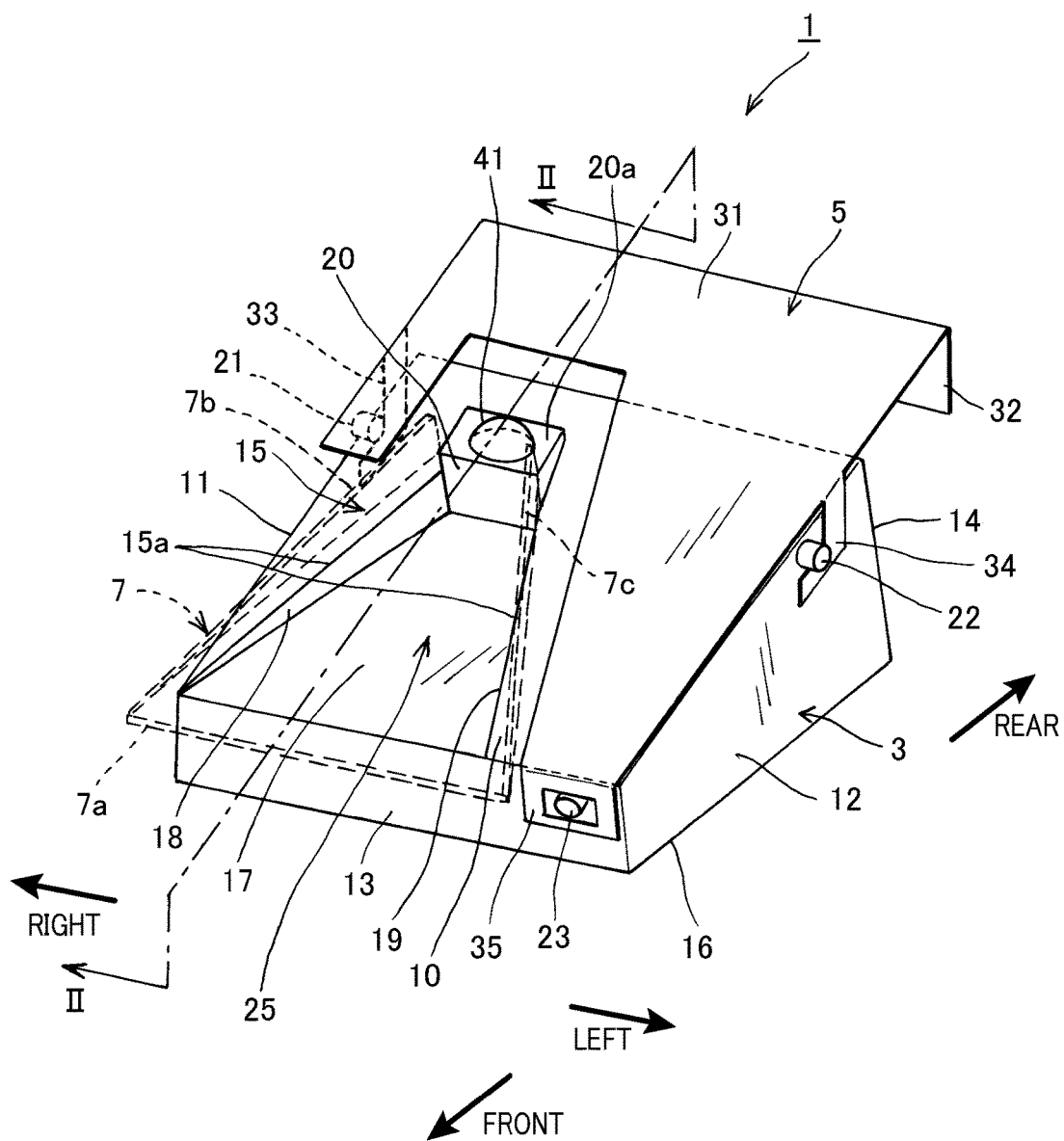
FIG. 1 is a perspective view schematically illustrating an example of the configuration of a vehicular camera according to an exemplary embodiment of the present disclosure.
Figure 2:
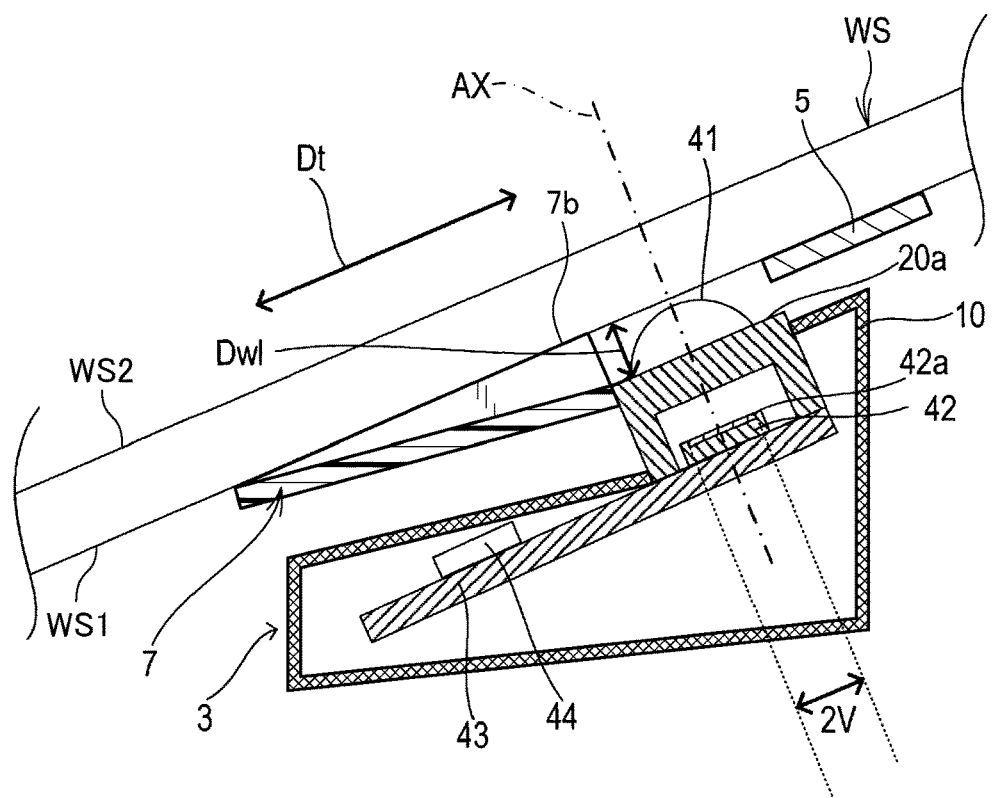
FIG. 2 is a cross sectional view taken on line II-II of FIG. 1.

Referring to for example FIGS. 1 and 2, the vehicular camera 1 is mounted to the inner surface WS1 of a front windshield WS, referred to simply as a windshield WS, of a vehicle 100 and disposed in the interior of the vehicle 100. The vehicular camera 1 is located close to the rearview mirror of the vehicle 100. The vehicular camera 1 is capable of capturing images of a predetermined image region defined in front of the vehicle 100.

As illustrated in FIG. 2, the windshield WS is inclined with respect to the longitudinal direction, i.e. front-rear direction, of the vehicle 100. The inclination direction of the windshield WS relative to the longitudinal direction of the vehicle 100 will be referred to as an inclination direction Dt of the windshield WS.

In the specification, the directions defined for the vehicular camera 1 or each element of the vehicular camera 1 are identical to the directions defined for the vehicular camera 1 or each element of the vehicular camera 1 while the vehicular camera 1 is mounted to the windshield WS.

This therefore results in the front and rear directions defined for the vehicular camera 1 or each element of the vehicular camera 1 being identical to the respective front and rear directions of the vehicle 100. Similarly, this results in the right and left directions defined for the vehicular camera 1 or each element of the vehicular camera 1 being identical to the respective right and left directions of the vehicle 100, and upper and lower directions defined for the vehicular camera 1 or each element of the vehicular camera 1 being identical to the respective upper and lower directions of the vehicle 100.

Referring to FIG. 1, the vehicular camera 1 includes a camera module 3 and a bracket 5.

The camera module 3 is comprised of a housing 10 and a lens 41. The housing 10 has a substantially rectangular parallelepiped shape with an inner hollow container space. The housing 10 has a rightward surface 11, a leftward surface 12, a rear surface 14, an upper surface 15, and a bottom surface 16.

The housing 10 also includes a trapezoidal concave recess 25 formed in the upper surface 15 downward. The trapezoidal concave recess 25 has a trapezoidal base surface 17, a rightward surface 18, and a leftward surfaced 19.

Each of the rightward and leftward surfaces 11 and 12 has a substantially trapezoidal shape. Specifically, each of the rightward and leftward surfaces 11 and 12 has a shorter side and a longer side that are substantially parallel with each other. The camera module 3 is mounted to the windshield WS such that the shorter side of each of the rightward and leftward surfaces 11 and 12 is located toward the front side of the vehicle 100, and the longer side of each of the rightward and leftward surfaces 11 and 12 is located toward the rear side of the vehicle 100.

Additionally, the camera module 3 is mounted to the windshield WS such that the rightward and leftward surfaces 11 and 12 are located on the respective right-hand and left-hand sides of the vehicle 100 while being parallel with each other along the travelling direction of the vehicle 100.

Each of the rightward and leftward surfaces 11 and 12 has non-parallel upper and lower sides, i.e. legs, connecting the shorter and longer sides thereof.

The front surface 13 has a substantially rectangular shape with parallel and opposite upper and lower sides, i.e. longer sides, and parallel and opposite vertical sides, i.e. shorter sides. The shorter sides of the front surface 13 are joined to the front sides of the respective rightward and leftward surfaces 11 and 12.

The rear surface 14 has a substantially rectangular shape with parallel and opposite upper and lower sides, i.e. longer sides, and parallel and opposite vertical sides, i.e. shorter sides. The shorter sides of the rear surface 14 are joined to the rear sides of the respective rightward and leftward surfaces 11 and 12.

The upper surface 15 has a substantially rectangular flat shape with a trapezoidal notched opening 15a. Specifically, the upper surface 15 has a rightward side joined to the upper side of the rightward surface 11, and has a leftward side joined to the upper side of the leftward surface 12. The upper surface 15 also has a front side joined to the upper side of the front surface 13, and has a rear side joined to the upper side of the rear surface 14.

Because the rear side of each of the rightward and leftward surfaces 11 and 12 is taller than the front side of the corresponding one of the rightward and leftward surfaces 11 and 12, the upper side of each of the rightward and leftward surfaces 11 and 12 is inclined to be lower as the upper side extends from its rear end to its front end. This results in the upper surface 15 being inclined to be lower as the upper surface 15 extends from its rear end to its front end.

In addition, the trapezoidal notched opening 15a, which constitutes the upper surface 15, is (1) Inclined to be lower as the trapezoidal notched opening 15a extends from its rear end to its front end (2) Tapered from its front end to its rear end The base surface 17 of the concave recess 25 constitutes a bottom portion of the concave recess 25, and faces the trapezoidal notched opening 15a. The base surface 17 is tapered from its front end to its rear end, which is similar to the trapezoidal notched opening 15a. The base surface 17 is inclined to be lower as the base surface 17 extends from its rear end to its front end more gradually than the upper surface 15.

The rightward surface 18 of the concave recess 25 constitutes a rightward portion of the concave recess 25, and connects a rightward side, i.e. edge, 15a1 of the trapezoidal notched opening 15a and a rightward side, i.e. edge, of the base surface 17.

The leftward surface 19 of the concave recess 25 constitutes a rightward portion of the concave recess 25, and connects a rightward side, i.e. edge, 15a2 of the trapezoidal notched opening 15a and a leftward side, i.e. edge, of the base surface 17.

That is, the rightward surface 18, the leftward surface 19, and the base surface 17 constitute the concave recess 25 concavely extending downward from the upper surface 15 and communicating with the trapezoidal notched opening 15a.

The housing 10 further includes a substantially rectangular-parallelepiped protrusion 20 having an inner hollow container space, an upper surface 20a, and an opening bottom surface.

The protrusion 20 is mounted to the rear end of the base surface 17. The protrusion 20 extends obliquely upward toward the windshield WS. The protrusion 20 projects from the trapezoidal notched opening 15a, so that the upper surface 20a of the protrusion 20 is higher than the upper surface 15 of the housing 10.

The lens 41 is mounted in the upper surface 20a such that the lens 41 communicates with the inner hollow container space.

In addition, the housing 10 includes a right protrusion 21, a left protrusion 22, and a front protrusion 23. The right protrusion 21, which has, for example, a substantially cylindrical shape, projects from a predetermined position of the rightward surface 11 for example outward perpendicularly to the rightward surface 11. Similarly, the left protrusion 22, which has, for example, a substantially cylindrical shape, projects from a predetermined position of the leftward surface 12 for example outward perpendicularly to the leftward surface 12. The predetermined position of the rightward surface 11 from which the right protrusion 21 projects is located to be for example opposite to the predetermined position of the leftward surface 12 from which the left protrusion 22 projects. The front protrusion 23, which has, for example, a substantially cylindrical shape, projects from a predetermined position of the front surface 13 for example outward perpendicularly to the front surface 13.

The bracket 5 is configured to mount the camera module 3 to the inner surface WS1 of the windshield WS. Note that the windshield WS is not illustrated in FIG. 1, and illustrated in FIG. 2.

The bracket 5 is comprised of a top board 31, a rear board 32, a right mounting member 33, a left mounting member 34, a front mounting member 35, and an unillustrated leaf spring.

The top board 31 is comprised of a plate-like member used to be attached to the inner surface WS1 of the windshield WS. The top board 31 is for example arranged above the upper surface 15 of the housing 10 to be substantially parallel with the upper surface 15. Specifically, the top board 31 has a substantially rectangular flat shape with a notched opening 31a. The top board 31 is configured such that (1) The notched opening 31a is located to face the base surface 17 of the concave recess 25 and the protrusion 20

(2) The notched opening 31a is shaped to expose the base surface 17 of the concave recess 25 and the protrusion 20

The rear board 32 is comprised of a rectangular plate-like member that extends downward from the rear end of the top board 31 to face an upper edge of the rear surface 32.

The right mounting member 33 is comprised of a plate-like member that has, for example, a substantially L shape. The L-shaped right mounting member 33 is comprised of a longer leg portion having opposing first and second ends, and a shorter leg portion having opposing first and second ends. The first end of the longer leg portion is mounted to a predetermined portion of the right edge of the top board 31. The longer leg portion extends downward. The first end of the shorter leg portion is joined to the second end of the longer leg portion. The shorter leg portion extends in the front direction such that an inner corner formed by the longer and shorter leg portions is engaged with the right protrusion 21.

The left mounting member 34 is comprised of a plate-like member that has, for example, a substantially L shape. The L-shaped left mounting member 34 is comprised of a longer leg portion having opposing first and second ends, and a shorter leg portion having opposing first and second ends. The first end of the longer leg portion is mounted to a predetermined portion of the left edge of the top board 31. The longer leg portion extends downward. The first end of the shorter leg portion is joined to the second end of the longer leg portion. The shorter leg portion extends in the front direction such that an inner corner formed by the longer and shorter leg portions is engaged with the left protrusion 22.

The front mounting member 35 is comprised of a rectangular plate-like member that has a through hole and extends downward from the front end of the top board 31 to face the front protrusion 23. This enables the front protrusion 23 to be fitted in the through hole of the front mounting member 35.

The leaf spring has opposing first and second ends, and the first end of the leaf spring is fixed to the inner surface of the rear board 32 such that the leaf spring extends toward the front of the vehicular camera 1.

The following describes how the camera module 3 is mounted to the bracket 5.

Specifically, while the top board 31 of the bracket 5 is attached onto the inner surface WS1 of the windshield WS, moving the camera module 5 enables (1) The right protrusion 21 to be engaged with the L-shaped right mounting member 33

(2) The left protrusion 22 to be engaged with the L-shaped left mounting member 34

(3) The front protrusion 23 to be inserted in the through hole of the front mounting member 35

(4) The leaf spring to urge the rear surface 14 of the housing 10 of the camera module 3 toward the front of the vehicle 100

This enables the camera module 3 to be fixedly mounted to the bracket 5 without the camera module 3 rattling.

Referring to FIG. 2, the camera module 3 includes the lens 41, an imager 42, a circuit board 43, and a microcomputer 44. At least the imager 42, circuit board 43, and microcomputer 44 are housed in the housing 10. The whole of the lens 41 can be exposed from the housing 10 via the trapezoidal notched opening 15a or a part of the lens 41 can be stored in the housing 10 while the remaining part of the lens 41 can be exposed from the housing 10 via the trapezoidal notched opening 15a.

The circuit board 43, which has a rectangular parallelepiped shape, is arranged in the housing 10 such that (1) A rear end of the circuit board 43 is located below the protrusion 20

(2) The protrusion 20 is mounted on the rear end of the circuit board 43

(3) The longitudinal direction of the circuit board 43 is parallel with the inclination direction Dt of the windshield WS The lens 41 is, for example, a central projection wide-angle lens having for example a convex hemispherical shape, and is mounted in the upper surface 20a of the protrusion 20 such that (1) The lens 41 communicates with the inner hollow container space of the protrusion 20

(2) The optical axis AX of the lens 41 is perpendicular to the windshield WS (3) At least part of the convex portion of the lens 41, which includes the principal point PO of the lens 41, is exposed from the upper surface 20a of the protrusion 20

The lens 41 configured and arranged set forth above enables light incident from a predetermined image region defined in front of the vehicle 100 to be captured; the image region has a predetermined horizontal angle region relative to the lens 41 and a predetermined vertical angle region relative to the lens 41.

The imager 42, which serves as, for example, a light detector, includes an image sensor, such as a known charge-coupled device (CCD) image sensor or a complementary metal-oxide-semiconductor (CMOS) image sensor, that is comprised of light-sensitive elements; the light-sensitive elements serve as pixels and are arranged in a two-dimensional array. That is, the array of the pixels is configured as a predetermined number of columns by a predetermined number of rows. The two-dimensionally arranged pixels constitute a rectangular flat light receiving area, i.e. a flat imaging area, 42a on which light incident to the imager 42 via the lens 41 is received.

That is, the imager 42 successively captures an image, i.e. a frame image, of a scene ahead of the vehicle 100 based on light incident from the image region to the imaging area via the lens 41 such that each of the two-dimensionally arranged light-sensitive elements (pixels) receives a corresponding component of light.

Then, the imager 42 successively outputs the image data based on the captured image to the microcomputer 44. The imager 42 is mounted on the rear end of the circuit board 43 such that (1) The imager 42 is located in the container space of the protrusion 20

(2) The center of the light receiving area 42a of the imager 42 is located to be coaxial with the optical axis AX of the lens 41

The microcomputer 44 is mounted on, for example, a front end of the circuit board 43, and is communicably connected to the imager 42. That is, the microcomputer 44 is programmed to receive the image data successively output from the imager 42, and perform predetermined tasks including a task for recognizing, based on the image data, various types of target objects located in front of the vehicle 100.

As described above, the camera module 3 is mounted to the inner surface WS1 of the windshield WS by the bracket 5 such that the optical axis AX of the lens 41 is perpendicular to the windshield WS, i.e. the inner surface WS1 of the windshield WS.

Additionally, the vehicular camera 1 includes a hood 7 made of, for example, a resin. The hood 7 includes a trapezoidal bottom wall 7a having shorter and longer sides parallel with each other. The shorter side of the bottom wall 7a of the hood 7 is attached to the upper portion of the front surface of the protrusion 20 such that the bottom wall 7a extends along the trapezoidal notched opening 15a above the base surface 17 of the concave recess 25. The bottom wall 7a of the hood 7 also has other opposing two lateral sides. The hood 7 includes two sidewalls 7b and 7c projecting upward from the respective lateral sides of the bottom wall 7a up to be abutted onto or close to the inner surface WS1 of the windshield WS. For the sake of, for example, illustration of the housing 10 located below the hood 7, the hood 7 is illustrated by dashed line in FIG. 1.

That is, the sidewalls 7b and 7c of the hood 7 are located in front of the lens 41 and located outside each of a predetermined horizontal and vertical view angles of the lens 41. In other words, the sidewalls 7b and 7c of the hood 7 serve as partitions that separate the image region defined based on each of the horizontal and vertical view angles of the lens 41 from the outside. This configuration and arrangement of the hood 7 prevent scenes located outside the image region defined based on the horizontal and vertical view angles of the lens 41 from being received by the light receiving area 42a of the imager 42.

In the present embodiment, because the lens 41 has a convex hemispherical shape, the horizontal view angle of the lens 41 is identical to the vertical view angle of the lens 41, so each of the vertical and horizontal view angles will be simply referred to as a view angle hereinafter.

In particular, the lens 41 has a predetermined focal length f defined in the following equation (1):

$$(V/11.43) \leq f \leq (V/2.48) \tag{1}$$

where V [mm] represents the half of the length of one side of the rectangular light receiving area 42a; this one side of the rectangular light receiving area 42a is located along the inclination direction Dt of the windshield WS.

The focal length of the lens 41 is defined as the distance between the principal point PO of the lens 41 and a predetermined focal point fp of the lens 41. That is, the imager 42 is arranged such that the center of the light receiving area 42a of the imager 42 is located to be coaxial with the optical axis AX of the lens 41, and the center of the light receiving area 42a is in agreement with the focal point fp of the lens 41.

Figure 3:
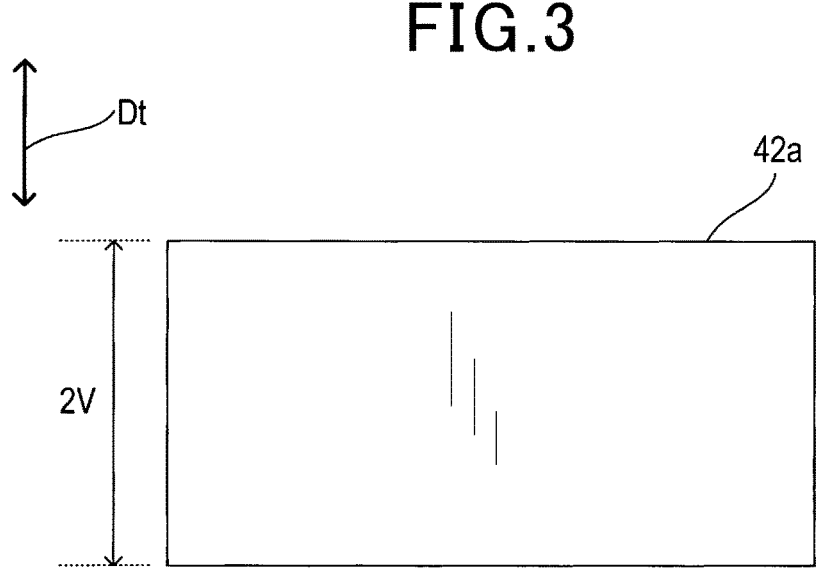
FIG. 3 is a plan view schematically illustrating an elevational view schematically illustrating an example of the structure of a light receiving area of an imager illustrated in FIG. 1.

For example, as illustrated in FIGS. 2 and 3, each lateral side, i.e. each shorter side, of the rectangular light receiving area 42a is located along the inclination direction Dt of the windshield WS, so that the length of each lateral side of the rectangular light receiving area 42a is represented by 2V.

Figure 4:
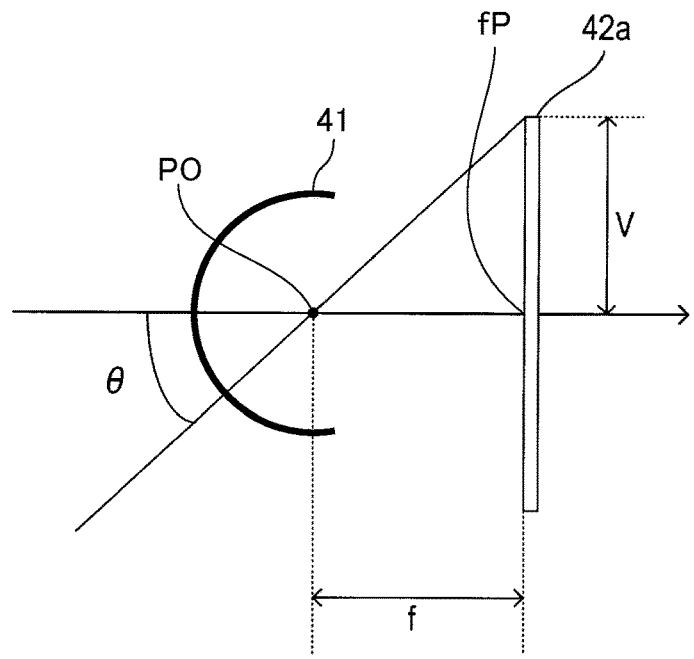
FIG. 4 is a view schematically illustrating a lens that has a predetermined focal length and is illustrated in FIG. 1.

FIG. 4 illustrates the relationship between the focal length f, the view angle of the lens 41, and the light receiving area 42a of the imager 42; the relationship can be expressed by the following equation (2):

$$f = V/\tan\theta \tag{2}$$

where θ represents the half of the view angle of the lens 41.

If the vehicle 100 has a relatively large height so that the angle of inclination of the windshield WS relative to the longitudinal direction of the vehicle 100 is 20 degrees, it is necessary for the lens 41 to have an angle of depression, i.e. a depression angle, of 15 degrees; the lens 41 having the depression angle of 15 degrees enables the vehicular camera 1 to capture a pedestrian located in front of the vehicle 100

Figure 5:
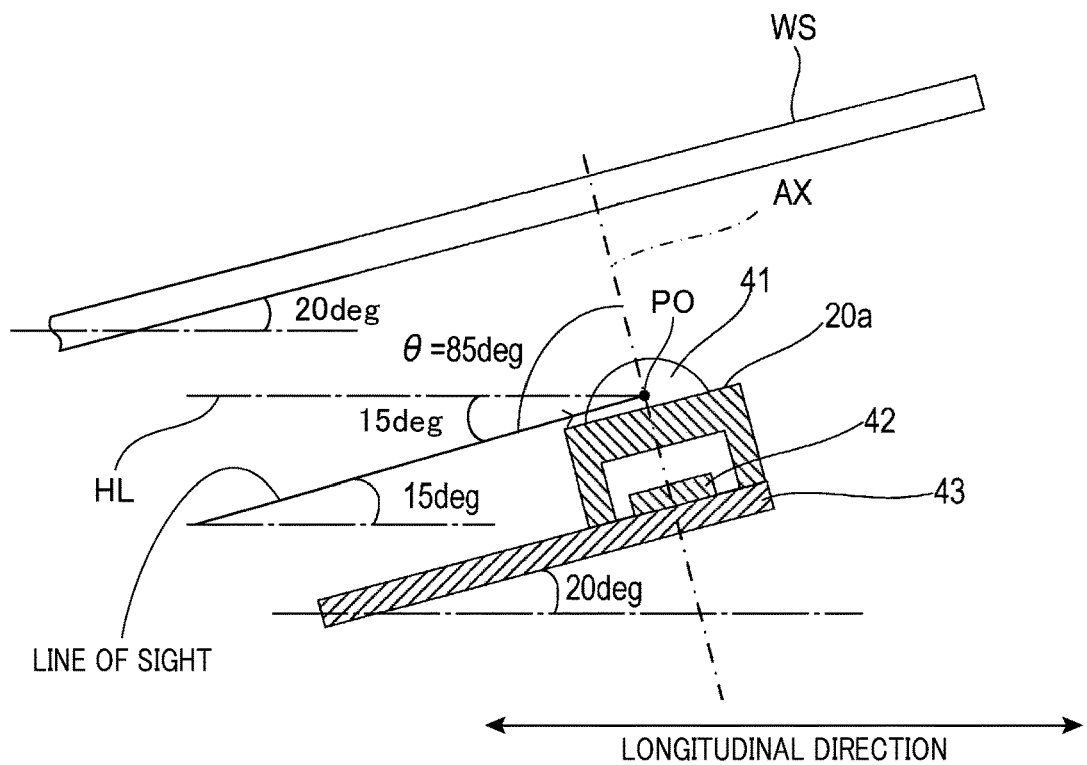
FIG. 5 is a view schematically illustrating how the vehicular camera is arranged with respect to a windshield of a vehicle while the lens has a depression angle of 15 degrees.

(see FIG. 5). Note that the depression angle of the lens 41 represents a downward angle of the lens 41 from a horizontal line HL passing through the principle point PO of the lens 41 to a line of sight defined by the view angle, i.e. the vertical view angle, of the lens 41.

Additionally, FIG. 4 schematically illustrates the distance between the lens 41 and the windshield WS to be wider than the distance between the lens 41 and the windshield WS illustrated in FIG. 2 for the sake of simply illustration of the arrangement of the housing 10 while the inclination angle of the windshield WS is 20 degrees.

Because this arrangement of the lens 41 to the windshield WS results in the angle θ of the lens 41 being the sum of 70 degrees and 15 degrees, that is, 85 degrees, the equation (2) results in the focal length f of the lens 41 being determined as V/11.43 that is substantially equal to V/tan (85°).

Figure 6:
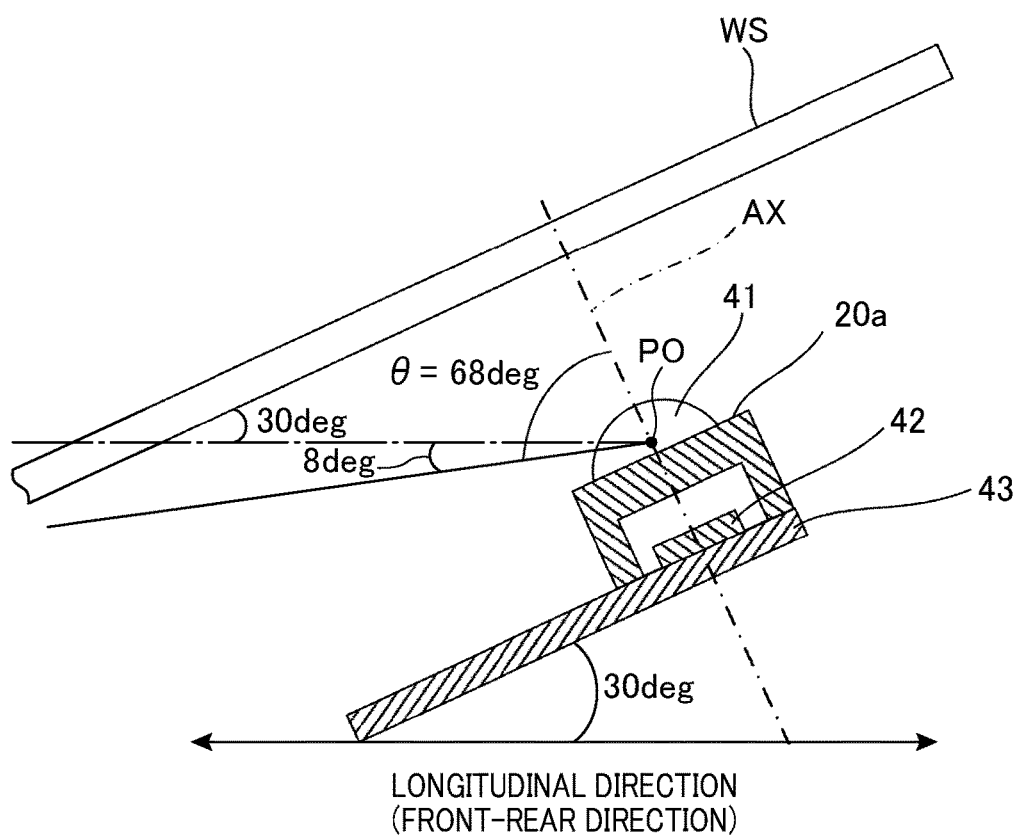
FIG. 6 is a view schematically illustrating how the vehicular camera is arranged with respect to the windshield of the vehicle while the lens has the depression angle of 8 degrees.

If the vehicle 100 has a relatively small height so that the angle of inclination of the windshield WS relative to the longitudinal direction of the vehicle 100 is 30 degrees, it is necessary for the lens 41 to have the angle of depression, i.e. the depression angle, of 8 degrees; the lens 41 having the depression angle of 8 degrees enables the vehicular camera 1 to capture a pedestrian located in front of the vehicle 100 (see FIG. 6). Note that FIG. 6 schematically illustrates the distance between the lens 41 and the windshield WS to be wider than the distance between the lens 41 and the windshield WS illustrated in FIG. 2 for the sake of simply illustration of the arrangement of the housing 10 while the inclination angle of the windshield WS is 30 degrees.

Because this arrangement of the lens 41 to the windshield WS results in the angle θ of the lens 41 being the sum of 60 degrees and 8 degrees, that is, 68 degrees, the equation (2) results in the focal length f of the lens 41 being determined as V/2.48 that is substantially equal to V/tan (68°).

That is, the above equation (1) shows the range of the focal length f of the lens 41 assuming that 1. The angle θ of 85 degrees of the lens 41 upon the inclination angle of the windshield WS being 20 degrees is set to its maximum angle (see FIG. 5)
2. The angle θ of 68 degrees of the lens 41 upon the inclination angle of the windshield WS being 30 degrees is set to its minimum angle (see FIG. 6)

In other words, setting the focal length f within the range defined by the equation (1) enables the half of the view angle of the lens 41 to be maintained within the range from 68 degrees to 85 degrees inclusive.

The vehicular camera 1 according to the present embodiment is arranged in the interior of the vehicle 100 to face the inner surface WS1 of the windshield WS, and configured to capture an image of a predetermined region defined in front of the vehicle 100.

In particular, the vehicular camera 1 includes the lens 41, the imager 42, and the housing 10.

The light receiving area 42a of the imager 42 receives light incident through the lens 41, and the imager 42 generates an image based on the light received by the light receiving area 42a.

The lens 41 is supported by the housing 10 while being at least partly exposed from the housing 10. The housing 10 is arranged relative to the windshield WS such that the lens 41 faces the inner surface WS1 of the windshield WS, and the optical axis AX of the lens 41 is perpendicular to the inner surface WS1 of the windshield WS.

The imager 42 is installed in the housing 10, and the light receiving area 42a of the imager 42 is arranged to be coaxial with the lens 41. The light receiving area 42a of the imager 42 is arranged to be parallel with the inner surface WS1 of the windshield WS, and the light receiving area 42a has a predetermined length of 2V [mm] along the inclination direction Dt of the windshield WS, i.e. its inner surface WS1.

Additionally, the focal length f of the lens 41 of the vehicular camera 1 is defined to be within the range from (V/11.43) to (V/2.48) inclusive.

The lens 41 of the vehicular camera 1 set forth above is arranged such that the lens 41 is at least partly exposed from the housing 40 and the optical axis AX of the lens 41 is perpendicular to the inner surface WS1 of the windshield WS.

As compared with a conventional vehicular camera having a lens whose optical axis is directed to the forward direction, i.e. front direction, of a corresponding vehicle, the vehicular camera 1 enables a minimum distance Dw1 defined between a farthermost point of the exposed portion of the lens 41 from the housing 10, i.e. a peripheral edge of the lens 41, which is abutted onto the upper surface 10a of the protrusion 10 (see FIG. 2), and the inner surface WS1 of the windshield WS to be lower. This therefore enables the size of the hood 7, which aims to prevent scenes located outside the image region of the vehicular camera 1 from being imaged by the light receiving area 42a of the imager 42, to be smaller than the size of a hood of the conventional vehicular camera.

Specifically, the vehicular camera 1 enables the size of each sidewall 7b, 7c of the hood 7 to be smaller than the size of each sidewall of the hood of the conventional vehicular camera.

In particular, the vehicular camera 1 is configured such that the focal length f of the lens 41 is set to be equal to or longer than the value of (V/11.43) and to be equal to or shorter than the value of (V/2.48).

This configuration enables the lens 41 to have a sufficient view angle required to capture longer target objects, such as pedestrians, located in front of the vehicle 100 even if the inclination angle of the windshield WS has a value within the range from 20 degrees to 30 degrees inclusive without an increase of the size of the hood 7.

The housing 10 houses the circuit board 43 on which the imager 42 having the light receiving area 42a, and the microcomputer 44 are mounted. This enables the imager 42 and the microcomputer 44 to be integrated with each other, resulting in the number of components constituting the camera module 3 to be smaller.

The present disclosure is not limited to the descriptions of the present embodiment, and the descriptions of the present embodiment can be widely modified within the scope of the present disclosure.

The housing 10 according to the present embodiment is arranged such that the lens 41 faces the inner surface WS1 of the windshield WS and the optical axis AX of the lens 41 is perpendicular to the inner surface WS1 of the windshield WS, but the present disclosure is not limited to the configuration.

Specifically, the optical axis AX of the lens 41 can intersect with the inner surface WS1 of the windshield WS at an angle selected from a predetermined angular range including a right angle, i.e. 90 degrees; the angular range has been designed suitably for achieving the object of the present disclosure set forth above. For example, the angular range has been designed as the range from 85 degrees inclusive to 90 degrees exclusive, so that the optical axis AX of the lens 41 can intersect with the inner surface WS1 of the windshield WS at an angle selected from the range from 85 degrees inclusive to 90 degrees exclusive, that is, the optical axis AX of the lens 41 can be substantially perpendicular to the inner surface WS1 of the windshield WS.

The vehicular camera 1 according to the present embodiment is configured such that the housing 10 is fixedly mounted to the windshield WS with the bracket 5, but the housing 10 cannot be fixedly mounted to the windshield WS as long as the optical axis AX of the lens 41 intersects with the inner surface WS1 of the windshield WS at an angle selected from the angular range. For example, the housing 10 according to this modification can be mounted to any element provided in the interior of the vehicle 100.

The lens 41 according to the present embodiment is configured to have the vertical and horizontal view angles that are identical to each other, but can have different vertical and horizontal view angles from each other. In this modification, setting the focal length f within the range defined by the equation (1) enables the half of the vertical view angle of the lens 41 to be maintained within the range from 68 degrees to 85 degrees inclusive.

The functions of one element in the present embodiment can be distributed as plural elements, and the functions that plural elements have can be combined into one element. At least part of the structure of the present embodiment can be replaced with a known structure having the same function as the at least part of the structure of the present embodiment. A part of the structure of the present embodiment can be eliminated. All aspects included in the technological ideas specified by the language employed by the claims constitute embodiments of the present invention.

The present disclosure can be implemented by various embodiments in addition to the image generating apparatus; the various embodiments include systems each including the image generating apparatus, programs for serving a computer as an assigning unit, storage media storing the programs, and image generating methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A vehicular camera to be installed in an interior of a vehicle to face an inner surface of a windshield of the vehicle, the inner surface of the windshield being inclined with respect to a longitudinal direction of the vehicle, the vehicular camera being configured to capture an image in front of the vehicle, the vehicular camera comprising:
a lens having an optical axis and a focal length;
a light detector having a light receiving area, the light receiving area being arranged to receive light incident thereto via the lens and being arranged such that a predetermined portion of the light receiving area is located along an inclination direction of the inner surface of the windshield;
a housing configured to support the lens and the light detector such that:
the lens faces the inner surface of the windshield; and
the optical axis of the lens intersects with the inner surface of the windshield at an angle selected from a predetermined angular range, the angular range including a right angle,
the focal length of the lens being set within a predetermined range expressed by the following equation:

$$(V/11.43) \leq f \leq (V/2.48)$$

where:
f represents the focal length; and
V represents half of a length in millimeters of the predetermined portion of the light receiving area along the inclination direction of the inner surface of the windshield.

2. The vehicular camera according to claim 1, wherein:
the light receiving area is comprised of a plurality of two-dimensionally arranged light-sensitive elements.

3. The vehicular camera according to claim 1, wherein the light detector is housed in the housing, and the lens is mounted to the housing while at least part of the lens is exposed from the housing.

4. The vehicular camera according to claim 1, further comprising:
a microcomputer communicably connected to the light detector and configured to perform a predetermined task based on the light received by the light receiving area of the light detector; and
a board on which the light detector and the microcomputer are mounted, the housing being configured to house the board on which the light detector and the microcomputer are mounted.

5. The vehicular camera according to claim 3, wherein:
the lens has a principal point;
the at least part of the lens exposed from the housing includes the principal point; and
the lens has a vertical view angle, half of the vertical view angle being within a range from 68 degrees to 85 degrees inclusive.

6. The vehicular camera according to claim 1, wherein:
the light detector is housed in the housing such that the light receiving surface of the light detector is substantially parallel with the inner surface of the windshield.

7. A vehicular camera assembly comprising:
a windshield of a vehicle; and
a vehicular camera mounted to the windshield of the vehicle to face an inner surface of the windshield, the inner surface of the windshield being inclined with respect to a longitudinal direction of the vehicle, the vehicular camera being configured to capture an image in front of the vehicle, the vehicular camera comprising:
a lens having an optical axis and a focal length;
a light detector having a light receiving area, the light receiving area being arranged to receive light incident thereto via the lens and being arranged such that a predetermined portion of the light receiving area is located along an inclination direction of the inner surface of the windshield;
a housing configured to support the lens and the light detector such that:
the lens faces the inner surface of the windshield; and
the optical axis of the lens intersects with the inner surface of the windshield at an angle selected from a predetermined angular range, the angular range including a right angle, the focal length of the lens being set within a predetermined range expressed by the following equation:

$(V/11.43) \leq f \leq (V/2.48)$ where:
f represents the focal length; and
V represents half of a length in millimeters of the predetermined portion of the light receiving area along the inclination direction of the inner surface of the windshield.

* * * * *